United States Patent [19]  
Katsumizu et al.

[11] Patent Number: 4,740,351  
[45] Date of Patent: Apr. 26, 1988

[54] METHOD OF AND ARRANGEMENT FOR PROTECTING NUCLEAR FUEL ASSEMBLY

[75] Inventors: Kenich Katsumizu, Yokohama; Takashi Sekine; Keiichi Aoki, both of Yokosuka; Keiji Suzuki, Higashimine; Teruaki Mishima, Yokosuka; Makoto Udaka, Yokosuka; Kojiro Komuro, Yokosuka, all of Japan

[73] Assignee: Japan Nuclear Fuel Co., Ltd., Japan

[21] Appl. No.: 706,342

[22] Filed: Feb. 27, 1985

[30] Foreign Application Priority Data

Feb. 29, 1984 [JP] Japan .................................. 59-37982  
Mar. 19, 1984 [JP] Japan .................................. 59-51048  
Apr. 7, 1984 [JP] Japan .................................. 59-69520  
Jul. 21, 1984 [JP] Japan ........................... 59-110720[U]

[51] Int. Cl.$^4$ .......................... G21C 3/34; G21C 21/00  
[52] U.S. Cl. ....................................... 376/446; 29/271; 29/723; 384/297  
[58] Field of Search ................. 29/423, 464, 468, 235, 29/271, 281.6, 723; 376/446; 384/297, 298, 300

[56] References Cited

U.S. PATENT DOCUMENTS

| 3,033,623 | 5/1962 | Thomson | 384/300 |
| 3,604,096 | 9/1971 | Shiroma | 29/235 |
| 3,770,582 | 11/1973 | Rogell | 376/446 |
| 3,933,583 | 1/1976 | Jabsen | 376/446 X |
| 4,277,874 | 7/1981 | Brown et al. | 29/235 |
| 4,300,328 | 11/1981 | Carlsen | 29/235 X |

FOREIGN PATENT DOCUMENTS

| 1274542 | 9/1961 | France | 384/300 |
| 932794 | 7/1963 | United Kingdom | 29/723 |
| 2084542 | 4/1982 | United Kingdom | 29/723 |

Primary Examiner—Kenneth J. Ramsey  
Attorney, Agent, or Firm—Antonelli, Terry & Wands

[57] ABSTRACT

A fuel assembly has a plurality of fuel rods arranged and held in parallel with one another in the cells of spacer assemblies arranged at suitable intervals. During the assemblying and transportation of the fuel assembly, flexible sleeves are inserted in respective cells such as to separate the fuel rods from parts provided on the walls of the cells, thereby protecting the fuel rod surfaces against any damage and scratch which may otherwise be caused due to interference between the fuel rod surface and the parts provided on the walls of the cell.

15 Claims, 18 Drawing Sheets

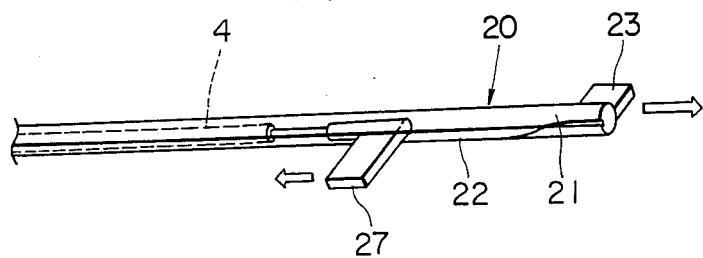
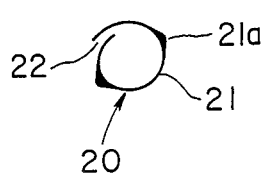
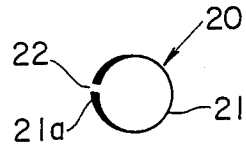
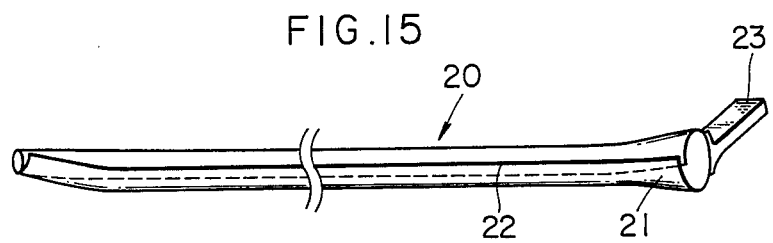
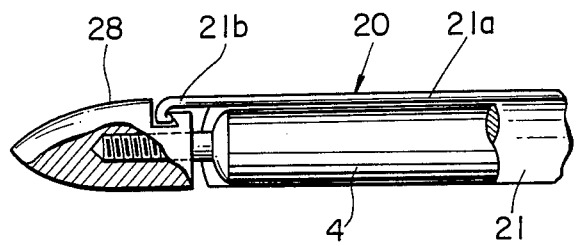

METHOD OF AND ARRANGEMENT FOR PROTECTING NUCLEAR FUEL ASSEMBLY

BACKGROUND OF THE INVENTION

The present invention relates to protection of nuclear fuel assemblies and, more particularly, to a method of and an arrangement for protecting a fuel assembly such as to avoid damaging and scratching of the fuel rod surfaces during assembly and transportation of the fuel assembly.

Different types of fuel assemblies are used in different types of nuclear reactors such as boiling water reactors (referred to as "BWR", hereinunder), pressurized water reactors (PWR) and so forth. Generally, however, a fuel assembly is an elongated member in which a plurality of elongated fuel rods are arranged and held in parallel with one another by spacer assemblies.

FIGS. 1 to 3 show, by way of example, a fuel assembly for use in a BWR having a square cross-section with fuel rods arranged in a square pattern. Known also is a fuel assembly having a circular cross-section in which fuel rods are arranged along concentric circles. This type of fuel assembly is suited for use in heavy-water moderated reactors and gas-cooled reactors.

The spacer assembly for holding the fuel rods in parallel can have various forms such as rectangular grids and circular grids. The fuel rods are held in the cells of the spacer assembly by means of holders such as a spring-clip type holder and lantern-ring type holder.

The fuel assembly shown in FIG. 1 will be explained in detail. This fuel assembly has a channel box 1 accomodating a plurality of fuel rods 4 and water rods 5 which are supported at their upper and lower ends by an upper tie plate 2 and a lower tie plate 3. A plurality of spacer assemblies 6 are disposed in the channel box 1 in the axial direction of the latter, such as to hold the fuel rods 4 in parallel and to suppress any lateral vibration of the same, while preserving passages of the coolant.

As will be seen from FIGS. 2 and 3, the spacer 6 has a square frame 7 in which are disposed bars 8, 9 and dividers 10, 11 in a grid-like form thus defining a plurality of cells 12. A lantern spring 13 is provided at each point of intersection of the bars 8 and 9. Each lantern spring 13 has leaf springs which project outwardly from all sides thereof. The leaf springs 13a resiliently press the fuel rod 4 in each cell 12 against S bends 10a, 11a formed on the dividers 10, 11 and dimples 14 projecting inwardly from the walls of the frame 7.

For the assembly of the fuel assembly, the lower tie plate 3 and the spacer assemblies 6 are fixed at suitable positions and the fuel rods 4 and the water rods 5 are inserted into the cells 12 of the spacer assemblies 6, such that the lower ends of the rods 4, 6 are fixed in the lower tie plate 3. Then, the upper tie plate 2 is mounted on the upper end of the frame 7 thus fixing the fuel rods 4 and the water rods 5.

During the assembly of the fuel assembly, the surfaces of the fuel rods tend to be damaged because they slide on the surfaces of the leaf springs 13a of the lantern spring 13 and the S-bends 10a and 11a. The same problem is encountered not only by the spacer assembly shown in FIG. 2 but also by various other types of spacer assemblies.

Hitherto, various methods have been proposed to protect the surfaces of the fuel rods. For instance, it has been proposed to tie the leaf springs 13a and S-bends 10a, 11a by cords against their resiliency thus preserving a large area in each cell 12 for receiving the fuel rod. It has been also proposed to keep the fuel rod below the ice point such as to form a coating layer of ice or frost on the fuel rod surface. According to still another method, the fuel rods are beforehand painted with a lacquer and, after the assembly, the lacquer is washed away.

The protection method relying upon the ice or frost coating layer necessitates pre-cooling of the fuel rod down below the ice point. In addition, this method is not adoptable for the fuel rod protection during withdrawal which often becomes necessary when, for example, the defective fuel rod is renewed, because the formation of the ice or frost coating layer on the fuel rod situated in the fuel assembly is almost impossible. The protection method using the cords is quite troublesome and takes a long time. The use of a lubricant may impair the performance of the fuel assembly due to deposition of impurities on the fuel rod. In order to completely remove the lubricant, it is necessary to wash it away at a cost of time and labour.

Thus, the conventional fuel rod protection methods are generally laborious and hinders the assembling.

The damaging of the fuel rods in the spacer assembly takes place not only during the assembly but also during transportation. Namely, during transportation of the completed fuel assembly, the fuel rods which are held in pressure contact with the S-bends 10a and 11a by means of the resilient pressure members such as the leaf springs are liable to be fretted due to vibration of the fuel assembly. To avoid this problem, it has been proposed to use flexible plastic liner 21 of a length almost equal to that of the fuel rod. Namely, as shown in FIG. 4, a liner 21 is placed at each side of the fuel rod in each cell, so as to suppress the vibration of the fuel rod and to prevent fretting of the fuel rod surface by the spacer assembly. However, the fuel assemblies 4a adjacent the walls of the frame 7 are likely to be damaged due to vibration, because these rods are pressed onto the dimples 14 by the leaf springs 13.

Japanese Patent Laid-Open No. 4609/1976 discloses a rod-like jig having a plurality of tabs designed for pressing the springs 13. On the other hand, Japanese Patent Laid-Open No. 36282/1977 and Japanese Patent Laid-Open No. 16089/1979 disclose jigs which are designed to be inserted into cells 12 such as to press the springs 13.

These known jigs are intended to retract the springs 13 in advance to the insertion of the fuel rods, thereby smoothing the movement of the fuel rods during insertion. However, these jigs cannot prevent the damaging of the fuel rods perfectly because, although the springs are retracted beforehand to become inactive, the fuel rods slide on the S-bends 10a, 11a and the dimple 14 when they pass through the cells 12. In some cases, the spring 13 is adversely affected by an excessive depressing by the jigs.

Japanese Patent Publication No. 11244/1978 discloses a fuel rod protection method in which a stainless steel protecting tube of about 0.1 mm thick is fitted around the fuel rod, and the fuel rod is inserted into the cell 12 together with this protecting tube. However, insertion and withdrawal of the fuel rod into and out of such a thin protecting pipe are troublesome. In addition, the fabrication and handling of such thin-walled long tube are quite difficult.

SUMMARY OF THE INVENTION

Accordingly, an object of the invention is to provide a method of and arrangement for protecting fuel rods such as to avoid any damaging or scratching of the fuel rod surface during assembly and transportation fuel assemblies.

To this end, according to one aspect of the invention, when the fuel rods are inserted into the cells of the spacer assemblies such as to form a fuel assembly, a flexible protective sleeve is inserted into at least the cell into which the fuel rod is to be inserted, before the insertion of the fuel rod.

The flexible protective sleeve is formed by winding a flexible sheet material in order to wrap the fuel rod inserted thereto. For detaching the flexible protective sleeve from the fuel rod, the sleeve is withdrawn in the direction perpendicular to the fuel rod so that both opposing side edges of the sleeve defining a longitudinal slit are moved apart to allow the fuel rod to pass through the slit.

According to the invention, therefore, it is possible to avoid scratching of the fuel rod surface because the portions of the fuel rod which slide on the spacer assembly during the fuel rod insertion are covered by the protective sleeve.

The protective sleeve may be left unremoved after insertion. In such a case, the protective sleeve protects the fuel rod also against the fretting which may otherwise be caused during the transportation. It is advisable to leave the protective tube on at least one of the fuel rods adjacent the wall of the frame of the spacer assembly, because the damaging of the fuel rod is most liable to occur on the portions of these fuel rods contacted by the dimples on the frame wall.

In order to prevent mutual contact between the dimple in the outer frame of the dimple and the outer periphery of the fuel rod, the invention proposes also an axially insertable flexible sleeve which can be slided into the cell along the frame wall.

When the fuel rod is to be withdrawn, the flexible sleeve is deformed such that its slit is opened to a greater degree and is made to surround the fuel rod. Then, the flexible sleeve is made to slide in the axial direction of the fuel rod such as to be positioned between the fuel rod and the spacer assembly. In this state, the fuel rod can be withdrawn without being scratched.

The above and other objects, features and advantages of the invention will become more clear from the following description of the preferred embodiments when the same is read in conjunction with the accompanying drawings.

BRIEF DESCRIPTION OF THE DRAWINGS

FIG. 10 is a fragmentary perspective view showing the state of withdrawal of a sleeve;

FIGS. 11 to 14 are cross-sectional views of modifications of the jig;

FIGS. 15 and 16 are a perspective view and a partial vertical sectional view of a different modification of the jig;

DESCRIPTION OF THE PREFERRED EMBODIMENTS

Figure 1:
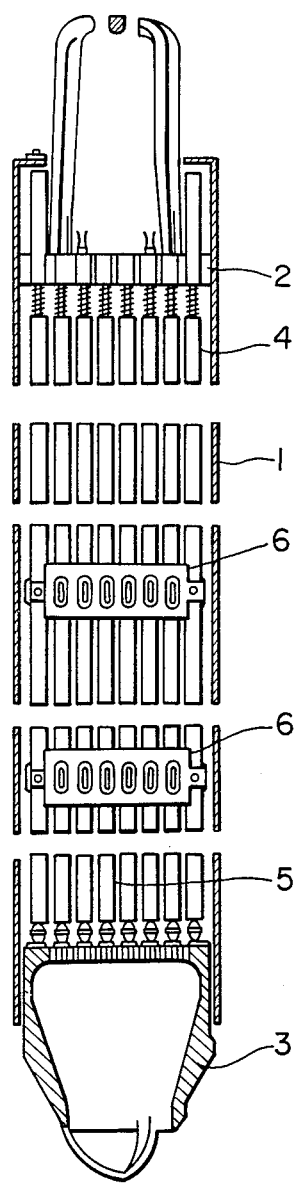
FIG. 1 is a vertical sectional view of a fuel assembly.
Figure 2:
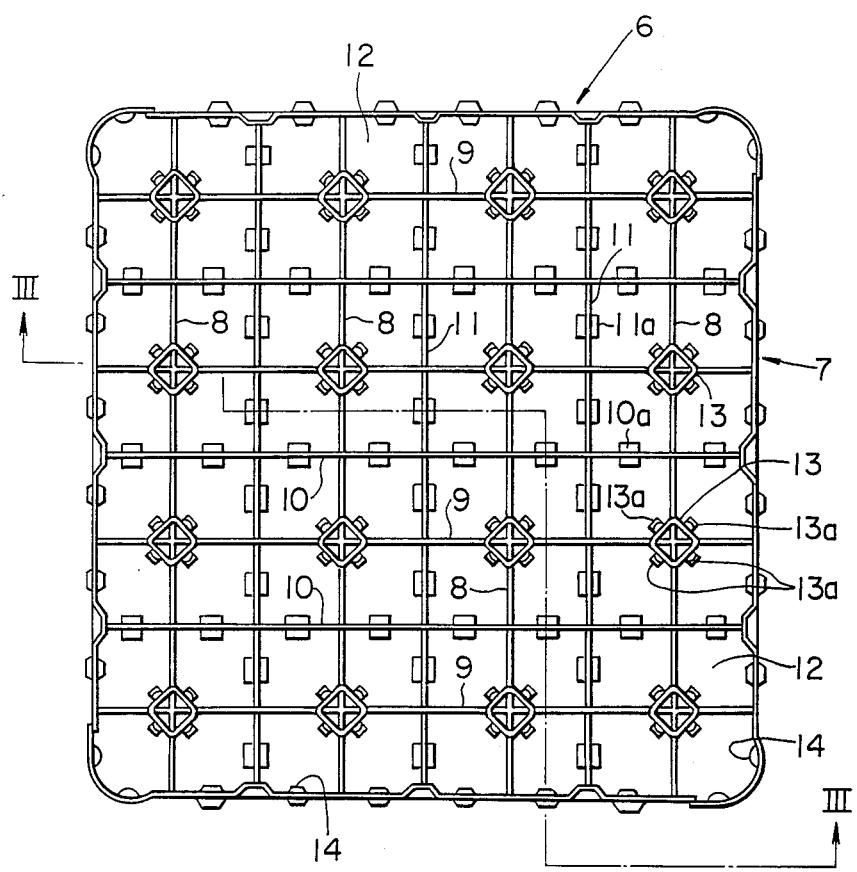
FIG. 2 is an enlarged plan view of s spacer assembly.
Figure 3:
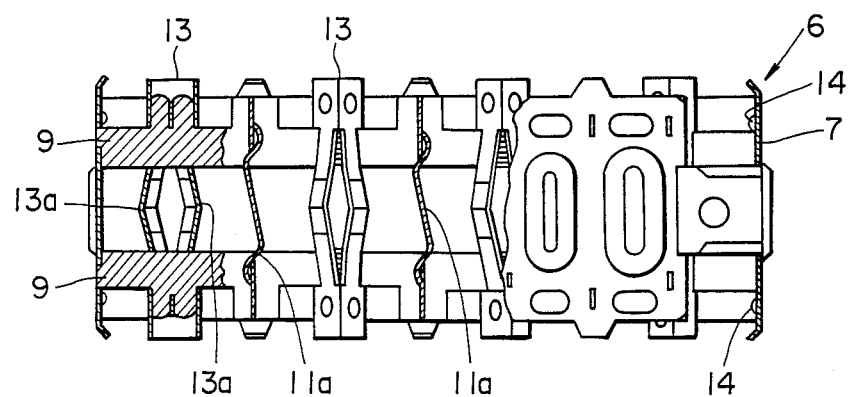
FIG. 3 is a sectional side elevational view taken along the line III—III of FIG. 2.
Figure 4:
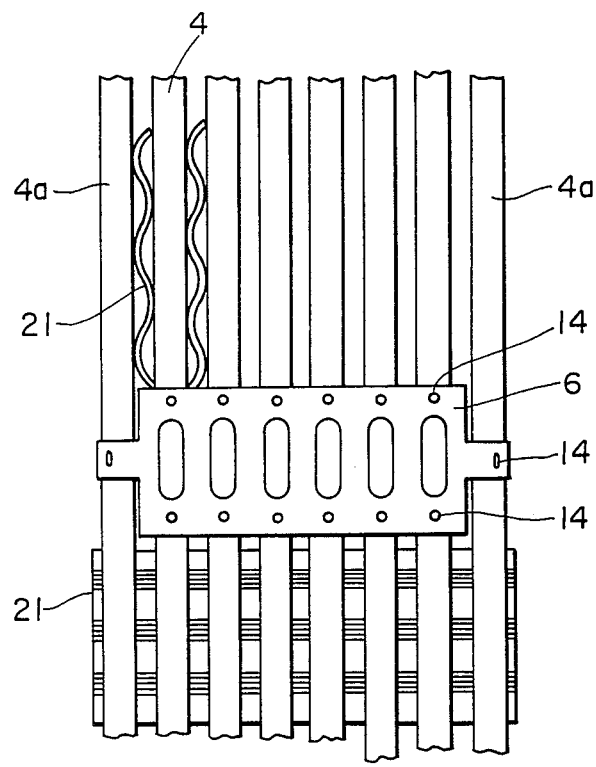
FIG. 4 is a side elevational view of a conventional liner in the state of use.
Figure 5:
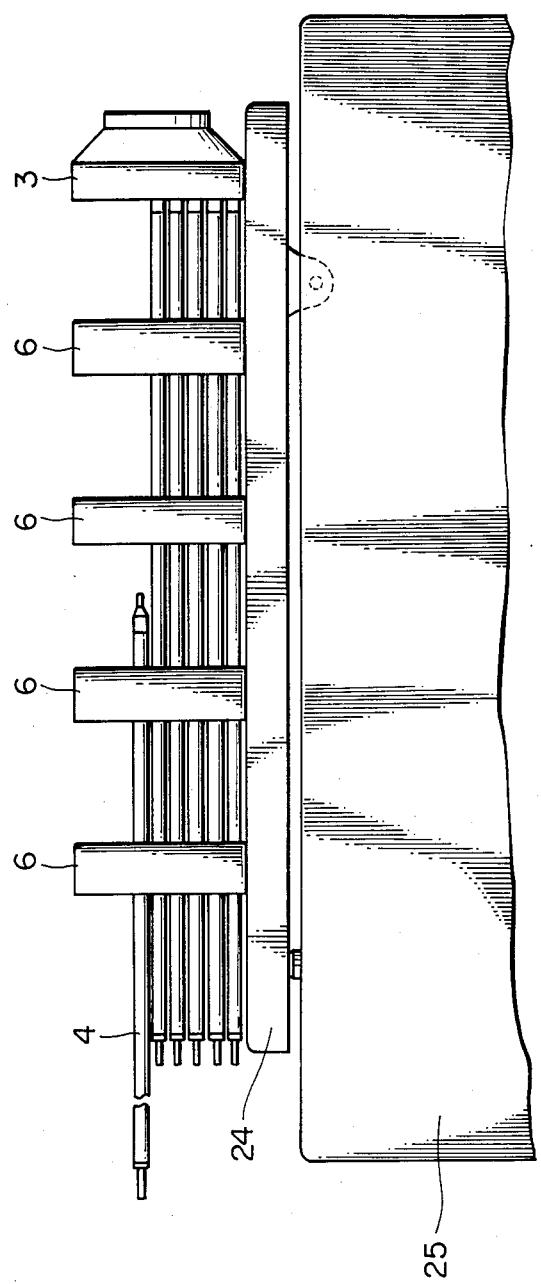
FIG. 5 is a side elevational view of a fuel assembly illustrating the procedure of assembly of the fuel assembly.

FIG. 5 shows a fuel assembly in the assembling process. A plurality of spacer assemblies 6 and a lower tie plate 3 are disposed in horizontal alignment and at a predetermined spacing on a swingable table 24 of a bed 25. Fuel rods 4 are inserted into the lower tie plate 3 through the spacer assemblies 6, thus forming a fuel assembly.

Figure 6:
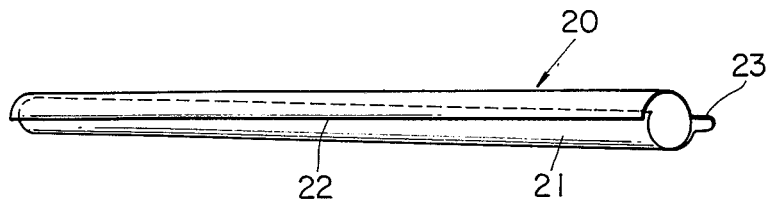
FIG. 6 is a perspective view of an embodiment of a jig in accordance with the invention.
Figure 7:
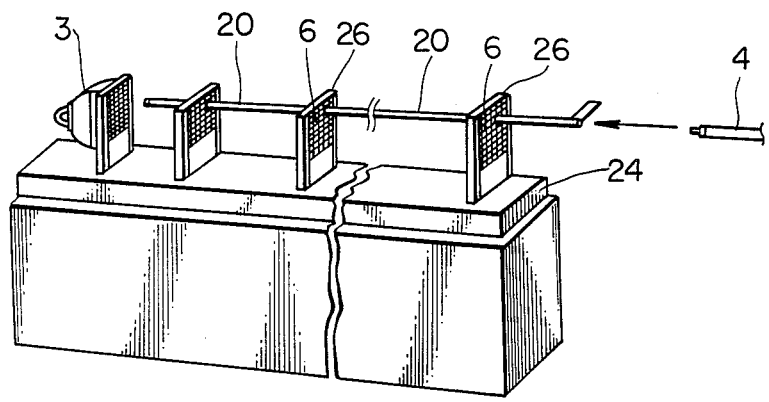
FIG. 7 is an illustration showing the state of assembly of the fuel assembly.

A first embodiment of the invention will be explained hereinunder with reference to FIGS. 6 to 16. Referring to FIG. 6, a reference numeral 20 designates a jig having a sleeve 21 which is formed by winding an elongated polyester film into a cylindrical form having a length substantially equal to the overall length of the fuel rod. Both side edges of the sleeve 21 over lap each other. That is, the sleeve 21 has an axially extending longitudinal slit 22. A handle 23 is provided on one end of the sleeve 21. In the freed state of the sleeve 21 of the jig 20, both edges defining the slit 22 are superposed to each other so that the sleeve 21 takes a spiral cross-section.

The jig 20 is used for the purpose of protecting the fuel rod during the assembly of the fuel assembly. A description will be made hereinunder as to the manner in which the fuel assembly is assembled.

Figure 9:
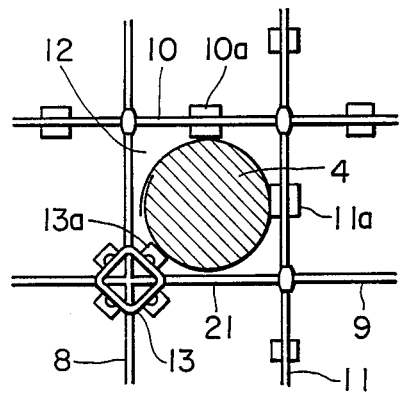
FIG. 9 is a horizontal sectional view of a spacer assembly shown in FIG. 8 with a fuel rod received in each cell of said fuel rod.

More specifically, mounting members 26 are placed on predetermined portions of the table 24, and spacer assemblies 6 and the lower tie plate 3 are secured to these mounting members 26. The sleeve 21 of the jig 20 is inserted into the axially aligning cells 12 of the spacer assemblies 6. This can be made smoothly because the sleeve 21 is wound in a spiral form to have a reduced diameter, so that the sleeve 21 can be inserted smoothly into the cells 12. Then, a fuel rod 4 are inserted into the sleeve 21 from one axial end of the latter. In this state, each fuel rod contact the S-bends 10a and 11a, as well as the leaf spring 13a of the lantern spring 13 through the intermediary of the sleeve as shown in FIG. 9.

After the completion of the insertion of the fuel rod 4, the end of each fuel rod 4 is pressed in the inserting direction by a pusher 27 so that the fuel rod 4 is fixed against axial movement. Then, the handle 23 of the jig 20 is pulled in the direction opposite to the direction of insertion, so that the jig 20 is withdrawn from a spacer assembly 6. Since the sleeve 21 of the jig 20 has the longitudinal slit 22, the jig 20 can be withdrawn easily even though the fuel rod 4 is pressed by the pusher 27.

All fuel rods 4 are inserted in this manner thus completing the assembling of the fuel assembly.

In the first embodiment of the invention, a jig made of self-lubricating materials is used in the insertion of the fuel rods into the spacer assemblies 12. Since the S-bends 10a, 11a and the leaf springs 13a of the spacer assemblies 12 are covered by the elongated cylindrical sleeve 21 of the jig 20, the fuel rod is kept out of contact with the S-bends 10a, 11a and the leaf spring 13a so that the undesirable scratching of the fuel rod surface is avoided advatnageously.

When the fuel assembly is to be disassembled, the sleeves 21 of the jigs 20 are inserted to surround the fuel rods to be withdrawn, and the fuel rods are pulled together with the sleeves out of the spacer assemblies.

Figure 8:
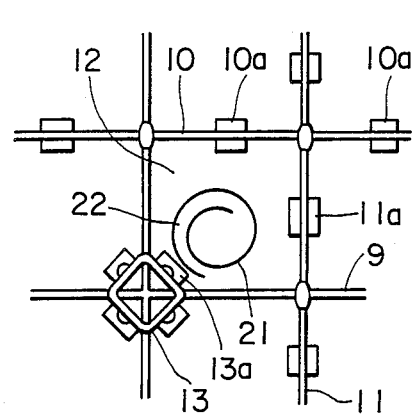
FIG. 8 is a horizontal sectional view of a spacer assembly with a jig inserted therein.

For information, in some cases, in which the lower tie plate is attached after the insertion of all fuel rods, sleeves 21 having no longitudinal slit as shown in FIGS. 11 and 12 can be used in place of the sleeve shown in FIG. 8 having the longitudinal slit. In these cases, a device capable of holding the lower ends of the fuel rods is used in place of the lower tie plate such as to fix the lower ends of the fuel rods, and then the jigs 20 are withdrawn in the direction opposite to the direction of insertion, thus allowing the withdrawal of the fuel rods.

FIGS. 13 and 14 show different modifications of the first embodiment, in which axially-extending thick-walled portions 21a are formed to stiffen the sleeves 21 of the jigs 20. Preferably, the thick-walled portion 21a is positioned so as not to contact the S-bends 10a, 11a and the leaf springs 13a.

In the described embodiment, the fuel rod is inserted into the sleeve 21 of the jig 20 after the insertion of the sleeve 21 into the cells 12 of the spacer assemblies 6. This, however, is not exclusive and the fuel rod may be first wrapped by the sleeve 21 and the inserted into the cells of the spacer assemblies as a unit with the sleeve 21. In such a case, the leading end of the sleeve 21 of the jig 20 as viewed in the direction of insertion is tapered or pointed as shown in FIG. 15 to facilitate the insertion.

In the case of the jig 20 as shown in FIG. 14, the stiffening thick-walled portions 21a is extended beyond the length of the sleeve 21 and a hook 21b is provided as shown in FIG. 16 to engage with a cap 28 provided on the end of the fuel rod 4. In this case, as the fuel rod 4 is inserted, the jig 20 is pulled by the fuel rod due to the engagement between the cap 28 and the hook 21b. Then, the cap 28 is detached just before the completion of the insertion. Then, the fuel assembly is assembled in the same way as the first embodiment.

In the described embodiment, the sleeve 21 of the jig 20 is made of a polyester film. The use of polyester, however, is not exclusive and the sleeve can be made of other suitable materials having large tensile strength and small tensile rupture elongation, as well as high self-lubricating power. It is to be noted that the described embodiment can be applied not only to the fuel assembly having spacer assemblies of lantern spring type but also to fuel assemblies having different types of spacer assemblies having resilient means for supporting the fuel rods, such as a grid type and honey-comb type spacer assemblies.

As has been described, according to the first embodiment of the invention, the insertion of the fuel rod into corresponding cells of the spacer assemblies is made while placing an elongated cylindrical sleeve made of a material having a self-lubricating power and of a length substantially equal to that of the fuel rod between the inner surfaces of the cells and the surface of the fuel rod. Therefore, the fuel rod is kept out of direct contact with the lantern spring and other damaging parts so that the undesirable damaging of the fuel rod surface is prevented during the insertion. It is to be understood that a single sleeve can prevent direct contact between the fuel rod surface and the damaging parts of a plurality of spacer assemblies, so that assembly and disassembly of the fuel assembly can be made guide easily without requiring any specific devices and steps.

A second embodiment of the invention will be described hereinunder, with specific reference to FIGS. 17 to 25.

Figure 17:
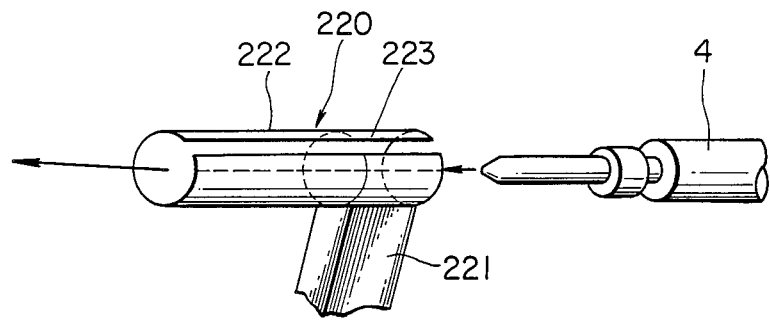
FIG. 17 is a perspective view of a second embodiment of the jig in accordance with the invention.
Figure 18:
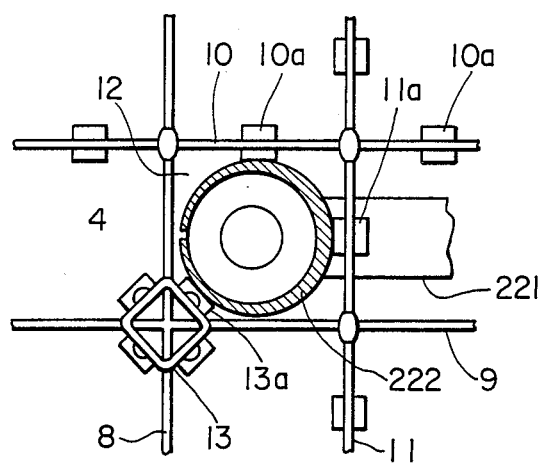
FIG. 18 is a horizontal sectional view of a spacer assembly in which a fuel rod has been inserted by the aid of a jig.

Referring to FIG. 17, a reference numeral 220 designates a jig in accordance with the invention. The jig 220 has a thin-walled sleeve 222 made of flexible and self-lubricating material such as polyester, provided at its one end with an arm 221 projecting radially therefrom. The sleeve 222 is provided with a longitudinal slit 223.

In the assembly of the fuel assembly, the sleeve 222 of the jig 220 is inserted into one axially aligned cell 12 of the spacer assembly, and then the fuel rod 4 is inserted into the sleeve 222 from one end thereof. After inserting the fuel rod 4, the jig 220 is moved in the axial direction of the fuel rod 4 so as to be withdrawn from the cells 12 of the spacer assemblies 6. Subsequently, the jig 220 is pulled in the direction perpendicular to the axis of the fuel rod 4 so that the jig 220 is taken off the fuel rod 4 while opening the slit 23.

Other fuel rods are inserted into corresponding cells 12 of the spacer assemblies 6 in the manner explained above, thus completing the fuel assembly. The movement of the jig 220 in both directions can be made by a ball-screw and a pulse motor or similar means under a suitable control.

Since the leaf springs 13a of the lantern springs 13 and other parts having a risk of damaging the fuel rod surface are covered by the jig 220 during the insertion of the fuel rod, the direct contact between the fuel rod surface and the parts is prevented and the undesirable scratching or fretting of the fuel rod surface are avoided effectively. Although the fuel rod 4 slides along the inner surface of the sleeve 222 of the jig 220, no damaging is caused by this sliding because the sleeve 222 is made of a self-lubricating material.

Namely, the friction between the fuel rod 4 and the jig 220 is small as compared with the friction between the fuel rod 4 and the parts such as the lantern springs 13 and S-bends 10a, 11a of the spacer assemblies, so that the fuel rods 4 can be inserted easily and smoothly into the cells 12 of the spacer assemblies 6. In addition, the detaching of the jig 220 from the fuel rod 4 is facilitated by the resiliency of the sleeve material and the presence of the longitudinal slit 220 in the sleeve 222.

Figure 19:
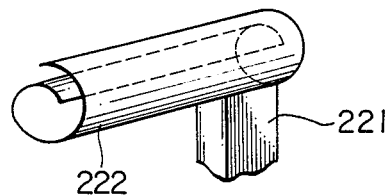
FIGS. 19 to 26 show modifications of the jig.
Figure 20:
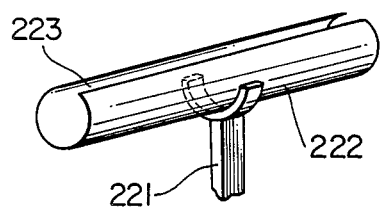
Figure 21:
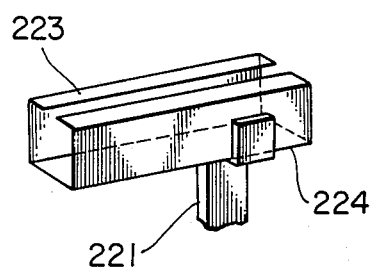
Figure 22:
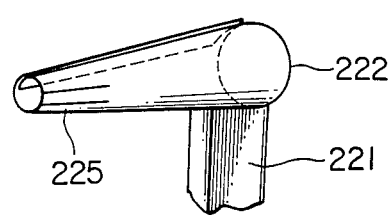
Figure 23:
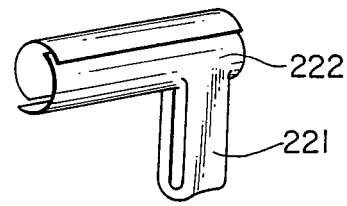
Figure 24:
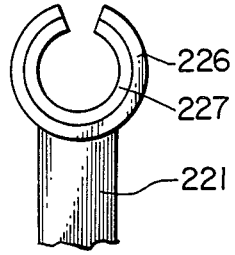
Figure 25:
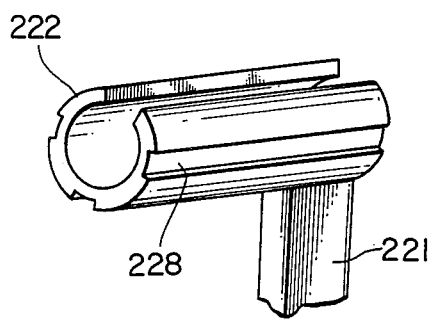

In the described second embodiment, the opposing side edges of the sleeve 222 of the jig 220 oppose each other to define the small slit 223 therebetween. This, however, is not exclusive and the sleeve may be wound to have a spiral cross-section with the opposing edges lapping each other as shown in FIG. 19. FIG. 20 shows another modification in which the arm 221 projects radially from the axially mid portion of the sleeve 222, while FIG. 21 shows still another modification in which the sleeve 224 has a rectangular cross-section. In a different modification shown in FIG. 22, the diameter of the sleeve 222 is varied along the length thereof such that the leading end has a smaller diameter and slits 225 are formed in this end such as to facilitate the insertion into the spacer assemblies. In a further modification shown in FIG. 23, the sleeve 222 is composed of two separate sheets curved to have semi-circular cross-sections. In a further modification shown in FIG. 24, the sleeve is composed of a metallic cylinder 226 lined at its inner side with a plastic layer 227. In a further modification shown in FIG. 25, the sleeve is provided in its outer surface with axial grooves 228 capable of engaging the parts such as the leaf springs 13a of the lantern springs 13 and the S-bends 10a, 11a on the spacer assemblies. By providing such axial grooves, it is possible to prevent undesirable offset or rotation of the jig during the insertion.

Obviously, this second embodiment can be applied not only to the fuel assembly having the spacer assemblies of the lantern spring type but also to fuel assemblies having any other grid type spacer assemblies having means for resiliently holding the fuel rods. It will be clear to those skilled in the art that, in the second embodiment described hereinbefore, the withdrawal of the fuel rods and, hence, the disassembly of the fuel assembly, can be made without causing any damage of the fuel rod surfaces, by taking a procedure reverse to the described procedure for the fuel rod insertion.

Figure 26:
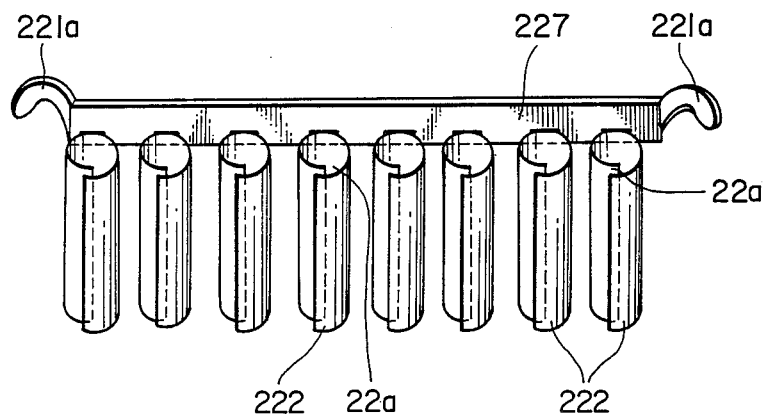
Figure 27:
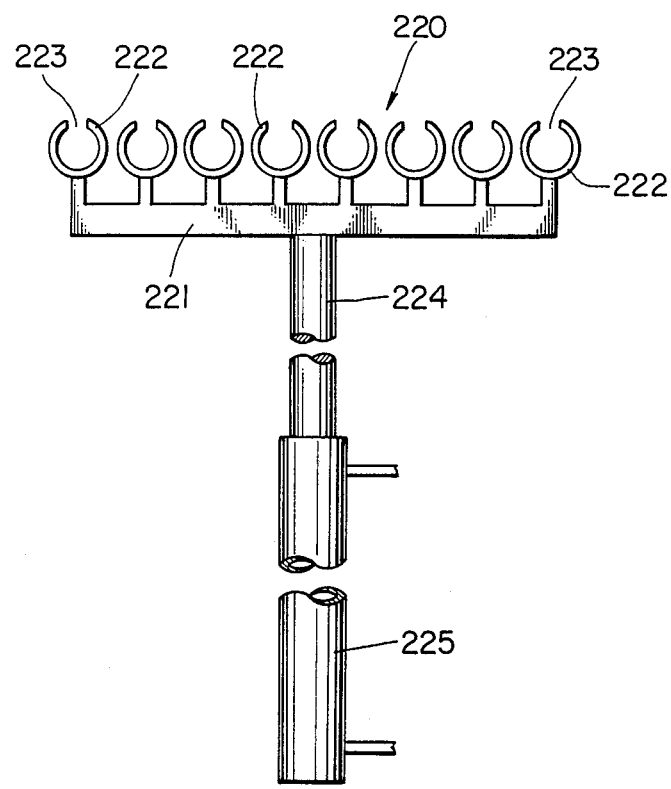
FIGS. 27 and 28 are illsutrations of different modifications of the second embodiment.

FIGS. 26 and 27 show further modifications of the jigs of the second embodiment. In this modification, sleeves 222 corresponding to one line of the cells 12 in the spacer assemblies 6 are arranged at the same pitch as the cells 12 and mounted on a supporting bar 227. A reference numeral 221a denotes handles provided on both ends of the supporting bar 227 adapted to rest on the top ends of opposing walls of the frame 7.

By using this jig, it is possible to insert the protective sleeves 222 into all of each line of the cells 12 of the spacer assemblies 6 at a time.

In the modification shown in FIG. 27, the supporting bar 227 carrying the row of the sleeves 222 are held by an operation rod 224 which is adapted to be moved by means of a fluid-operated cylinder device 225 so as to set the sleeves 222 in alignment with each of successive lines of the cells 12 of the spacer assemblies 6.

Figure 28:
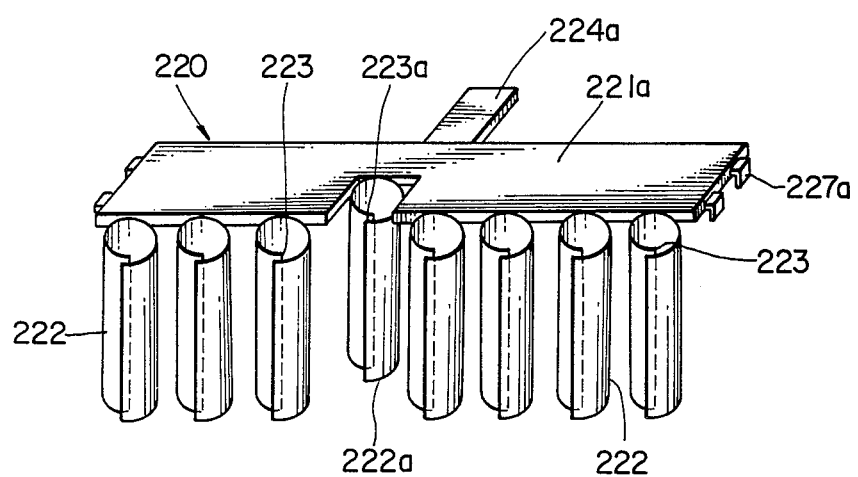

FIG. 28 shows a modification of the arrangements shown in FIGS. 26 and 27. In this modification, a supporting plate 221a is notched in a portion thereof corresponding to the position of a water rod 5 which has been inserted already into the spacer assemblies 6, and the sleeve 222a disposed in the position corresponding to the water rod 5 is offset such as to clear the water rod 5 during the insertion of the sleeves.

In FIG. 28, a reference numeral 224a denotes a supporting handle, while a numeral 227a shows handles corresponding to the handles 227 appearing in FIG. 26.

A third embodiment of the invention will be described hereinunder with reference to FIGS. 29 and 30.

Figure 29:
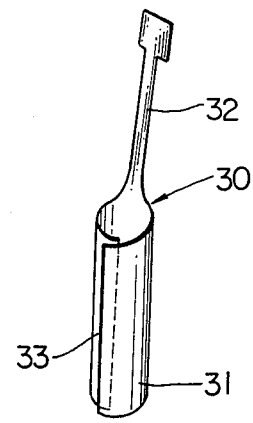
FIG. 29 is an illustration of a third embodiment of the invention, showing a fuel rod protective liner suitable for use in the transportation of a fuel assembly.
Figure 30:
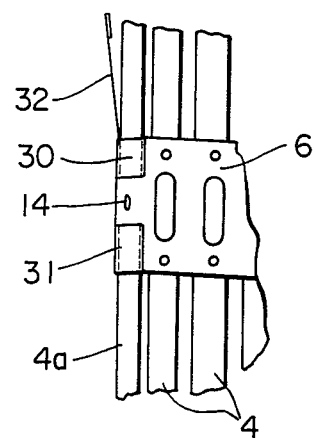
FIG. 30 is an illustration of the manner in which the liner is mounted in the fuel assembly.

FIG. 29 is a perspective view of a liner 30 in accordance with the invention. The liner 30 is composed of a sleeve 31 made of a thin sheet of a self-lubricating material such as polyester film and a handle 32 projected from the top edge of the sleeve 31. The sleeve 31 is provided with an axially extending slit 33.

During the transportation of the fuel assembly, the linear 30 is inserted such as to surround each fuel rod received in the cells of the spacer assemblies. More specifically, referring to FIG. 30 which shows the liner 30 used to protect the fuel rod 4a which is located at a corner of the spacer assembly 6, the liner 30 is first expanded radially to open its slit 33 and is moved laterally to receive the fuel rod 4a through the opened slit 33. Then, the liner 30 is moved in the axial direction such as to be placed between the fuel rod 4a and the dimples 14 on the successive spacer assemblies 6, thereby keeping the fuel rod 4a from direct contact with the dimples 14. Similarly, the fuel rods in the peripheral portion of the fuel assembly are surrounded by the liners 30 so as to be kept away from direct contact with the stationary parts of the spacer assemblies.

During the transportation, the fuel assembly may be vibrated to cause the fuel rod to slide on the parts such as the dimples 14 on the spacer assemblies. However, the fuel rod is protected against fretting force because the self-lubricating liner separates the fuel rod from such parts, so that the undesirable damaging of the fuel rod surface is prevented effectively.

The liner 30 can easily be withdrawn from the fuel assembly after the transportation as it is held at the handle 32 and pulled in the direction counter to the inserting direction.

Needles to say, the liner 30 may be used not only for the fuel rods disposed at the corners and sides of the fuel assembly but also for the fuel rods disposed in the central region of the same. The sleeve 31, which is made of a resilient film, can be withdrawn easily by being pulled from the outside of the fuel assembly by a cord connected to the handle 32.

Figure 31:
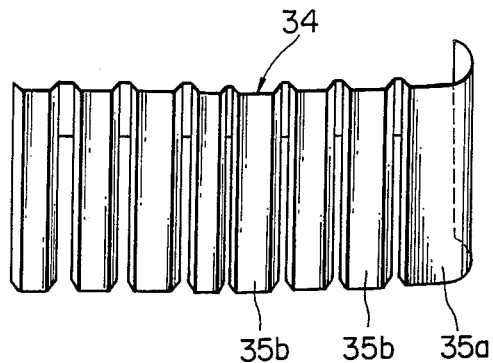
FIG. 31 is a side elevational view of a liner sheet in one aspect of the invention.
Figure 32:
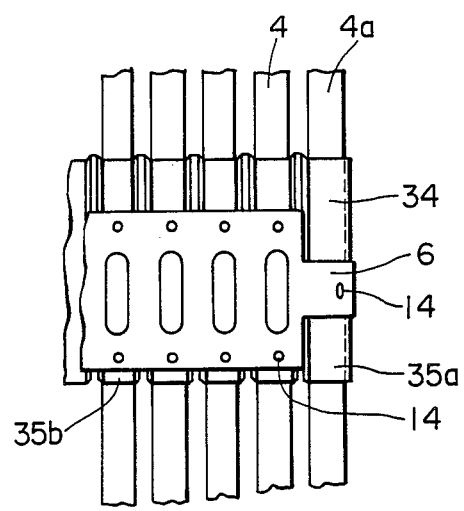
FIG. 32 is an illustration showing the state in which the liner sheet shown in FIG. 31 is mounted.

FIG. 31 shows a liner sheet in one aspect of the invention. In this arrangement, the plurality of liners are formed into one continuous web-like sheet member so as to be able to protect a line of fuel rods in the spacer assembly at a time. More specifically, a liner sheet 34 made of a self-lubricating web-like material provided at its both ends with end tabs 35a adapted to be wrapped on the fuel rods 4a which are located at the corners of the spacer assembly is prepared. A plurality of lining portions 35b are formed in the web portion between both end tabs such as to be able to come into cells 12 in a line with the spacer assembly. In other words, such is formed that adjacent lining portions 35b are connected each other at their sides.

Prior to the transportation of the fuel assembly, the liner sheet 34 is inserted into the spacer assemblies such that the end tabs 35a and lining portions 35b thereof are disposed between the surfaces of the fuel rods 4a, 4 and the inner surface of the wall of the frame 7 of the spacer assemblies, thus preventing fuel rod surfaces from being damaged by dimples and other parts on the spacer assemblies.

A plurality of liner sheets as shown in FIG. 31 may be assembled in a grid-like form and inserted into the cells 12 of the spacer assemblies such as to separate the fuel rods from the parts in respective cells such as the leaf springs 13a in the lantern springs 13, S-bends 10a, 11a and so forth, so that the fretting of the fuel rod surfaces due to friction is avoided effectively. Although in the embodiment shown in FIGS. 29 and 30 the liner 30 has a substantially cylindrical form, it is to be noted that this form is only illustrative and the liner 3 can have a polygonal cross-section. In addition, a plurality of sleeves 30 may be connected integrally.

In the arrangement described hereinbefore, the liners are inserted into the cells 12 of the spacer assemblies 6 after assembling of the fuel assembly, in order to prevent any fretting of the fuel rods during the transportation of the fuel assembly. The liners, however, may be used for preventing the fuel rods from being fretted during the insertion thereof. To this end, the liners may be inserted into the cells 12, 120 before the insertion of the fuel rods 4, 4a. After the assemblying of the fuel assembly, the liners may be left in the completed fuel assebly so that they effectively prevent the fuel rods being fretted during the transportation.

A fourth embodiment of the invention will be explained hereinunder with reference to FIGS. 33 to 42.

The fourth embodiment proposes a fuel rod guiding and protecting jig suitable for use in combination with an automatic assembling apparatus for automatically inserting the fuel rods 4, 4a into the cells 12 of the spacer assemblies 6.

Figure 33:
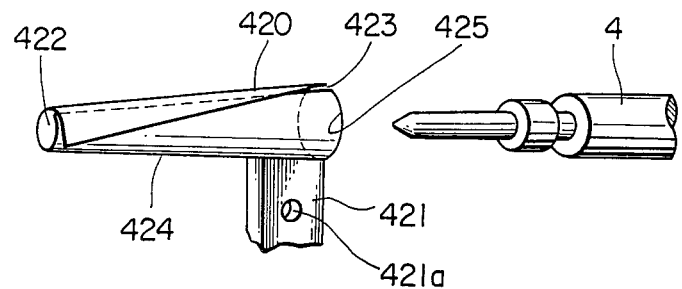
FIGS. 33 and 34 are perspective views of a fuel rod guiding and protecting jig which is a fourth embodiment of the invention, showing the jig in relation to the fuel rod.
Figure 34:
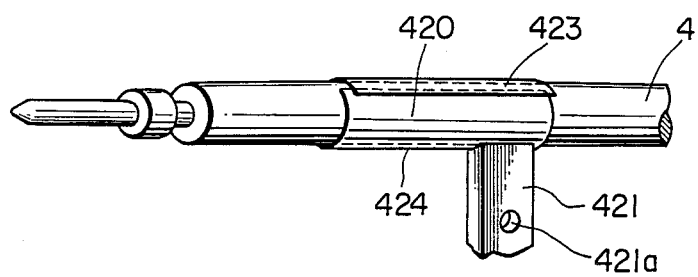

In FIG. 33, a tapered flexible sleeve 420 has a smaller leading end 422 and a larger trailing end 425 as viewed in the direction of insertion. When a fuel rod 4 is inserted into the sleeve 420, the sleeve 420 is deformed into a form as shown in FIG. 34 such as to have a slit 423 which extends substantially in parallel with the axis of the fuel rod 4 received in the sleeve 420. In the freed state of the sleeve 420, this slit 423 does not appear because the opposing edges of the sleeve 420 over lap each other as shown in the drawings.

The sleeve 420 is bonded to a handle 421 along a line 424 which diametetrically opposes the slit 423.

By way of example, the sleeve made of polyester materials and used in combination with a fuel rod 4 having an outside diameter of 12 mm has a wall thickness of 0.1 mm, diameters of about 13 mm and 8 mm at the large and smaller ends thereof, and an overall length of 80 mm.

Figure 35:
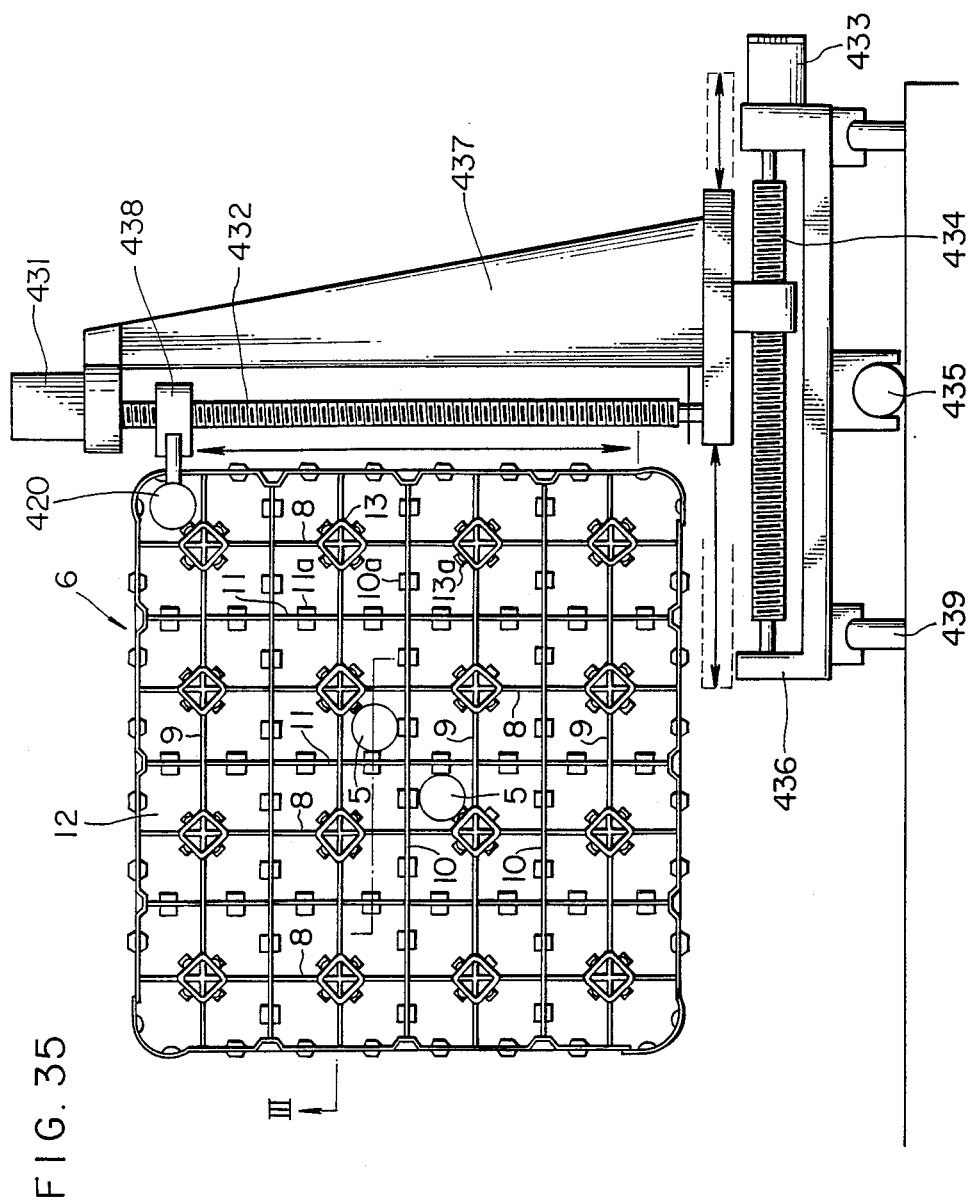
FIGS. 35 and 36 are illustrations of positional relationship between an automatic fuel assembly assembling apparatus and a spacer assembly in accordance with the invention.
Figure 36:
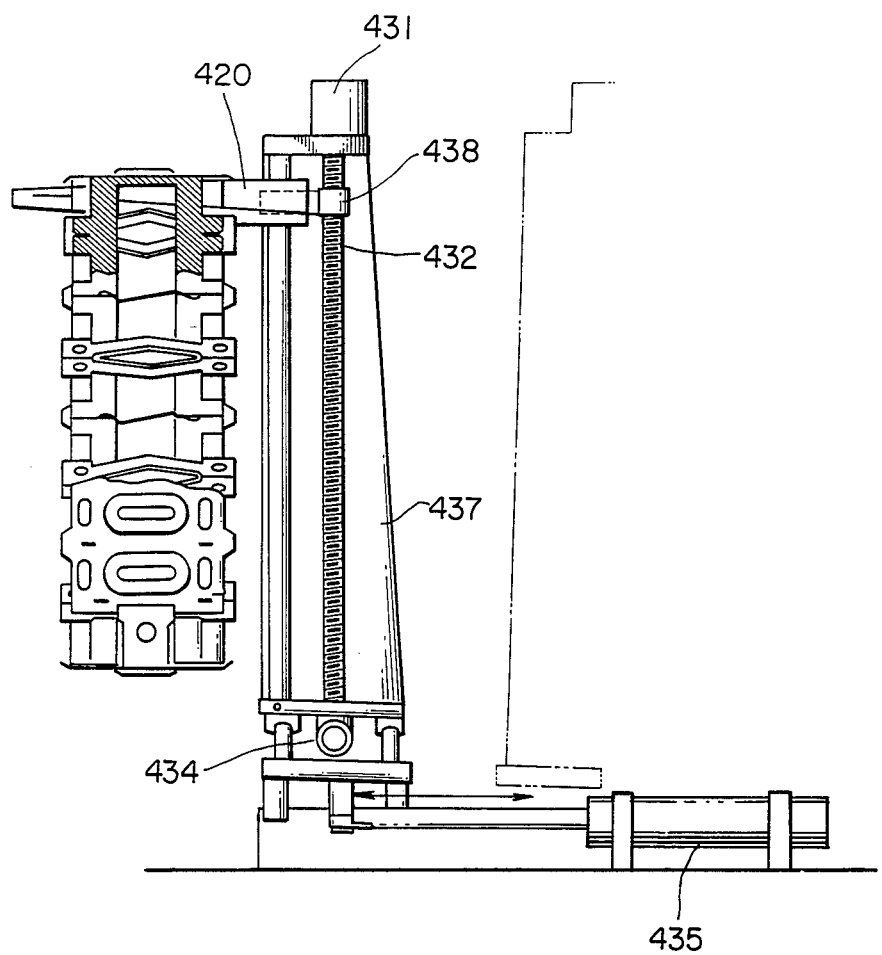

The distance between the slit in the sleeve 420 and the line along which the handle 421 is secured is varied such that an overlap of about 5 mm is formed when the fuel rod 4 is received in the sleeve 420. A reference numeral 421a denotes a hole which is used in mounting the fuel rod guiding and protecting jig on an automatic assemblying apparatus. FIGS. 35 and 36 show the positional relationship between a spacer assembly 6 and the automatic assembling apparatus. The automatic assembler has a base 936 which is movable on the floor by means of wheels 439 in the direction normal to the plane of the Figure by the action of a cylinder 435. The base 436 carries a motor 433 adapted to drive a horizontal screw shaft 434 which in turn causes a movement of a truss 437 in the horizontal direction. The truss 437 supports a vertical screw jack 431 which is adapted to be driven by a motor 431. A bracket 438, which pivotally supports the fuel guiding and protecting jig (see FIGS. 33 and 34), engages with a screw shaft 432 of the screw jack 431, such that the bracket 438 is moved up and down as the screw shaft 432 is rotated.

In operation, both the horizontal and vertical screw jacks are driven to bring the fuel rod guiding and protecting jig into alignment with the aimed cell 12 of the spacer assembly 6, and the base 436 is moved in the direction of insertion by the action of the cylinder 435, so that the fuel rod guiding and protecting jig is inserted into the cell 12. With the sleeve received in the cell 1, the fuel rod 4 is inserted into the cell 12. Since the fuel rod 4 is guided and protected by the sleeve 420, the undesirable scratching of the fuel rod due to contact with the damaging parts on the spacer assembly is avoided advantageously.

Figure 37:
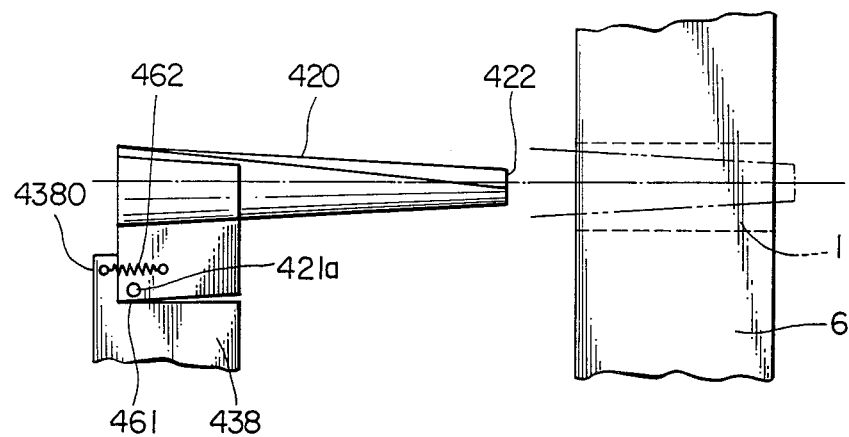
Figure 38:
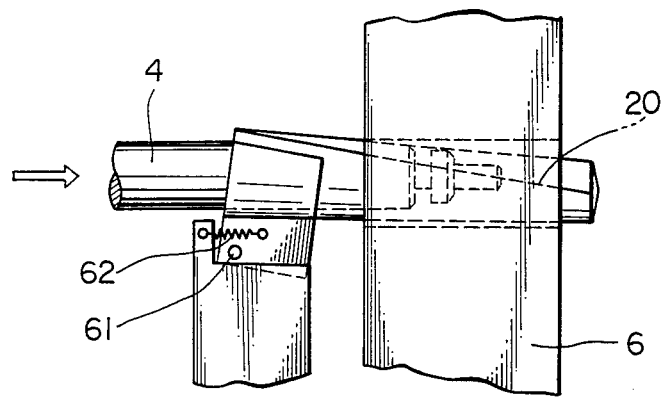

FIGS. 37 and 38 show positional relationship between the fuel rod guiding and protecting jig and the cell 12 in the spacer assembly 6. The handle 421, which is pivotally connected to the bracket 438 through the mounting hole 421a thereof, is biased counter-clockwise as viewed in the drawings by means of a spring 461. Since the rear end of the handle 421 abuts a stopper 438a on the bracket 438, the smaller end 422 of the sleeve 420 aligns with the center of the cell 12.

As the automatic assemling apparatus is moved by the operation of the cylinder 435, the sleeve 420 is inserted into the cell 12 with its smaller end 422 directed inwardly, so that the fuel rod 4 is smoothly moved in the cell 12.

Since the fuel rod 4 is moved in parallel with the side wall of the cell 12 during the insertion, the sleeve 420 through which the fuel rod 4 is driven rocks around the mounting hole 421a such that the line 424 along which the handle 421 is secured extends in parallel with the wall of the cell 12, into the state as shown in FIG. 38.

Figure 39:
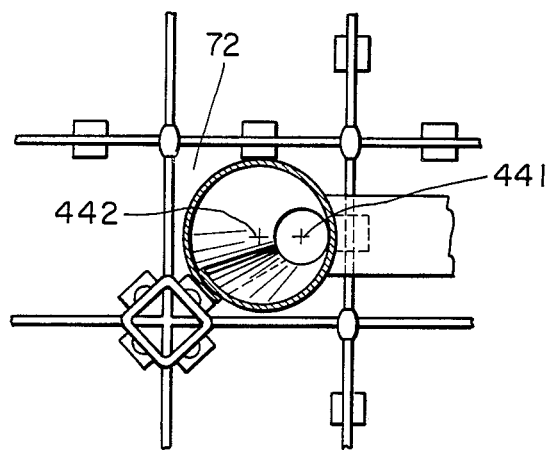
FIGS. 37 to 39 are illustrations of the fuel rod guiding and protecting jig.

In FIG. 39, a numeral 441 denotes the center of the smaller end 422 of the sleeve 420, while a numeral 442 designates the center of a fuel rod 4 received by the sleeve 420.

Figure 40A:
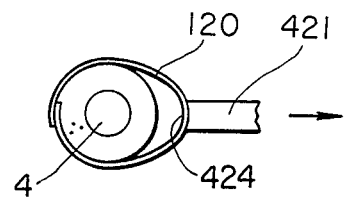
FIGS. 40a to 40d are illustrations of operation of the jig during demounting of the jig from a fuel rod.
Figure 40B:
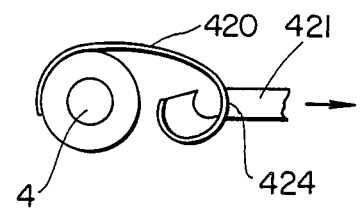
Figure 40C:
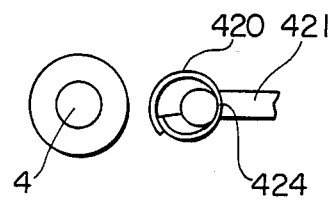
Figure 40D:
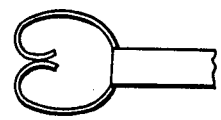

After the insertion of the fuel rod 4, the automatic assembling apparatus is moved by the cylinder 335 away from the spacer assembly so that the sleeve 420 is withdrawn from the cell 12. Then, the horizontal screw jack 434 is driven to pull the handle 421 in the direction perpendicular to the axis of the fuel rod 4, so that the sleeve 420 is forcibly separated from the fuel rod 4 while opening its slit 423. Since the distances between the line 242 along which the handle 421 is secured and both side edges difining the slit of the sleeve 420 are different from each other as stated before, the sleeve 420 comes off the fuel rod in a manner shown in FIGS. 40a to 40c and resumes its original form. If the above-mentioned distances are substantially equal to each other, there is a fear that both edges defining the slit abut each other as shown in FIG. 40d such as not to allow the sleeve to resume the original form.

Figure 41:
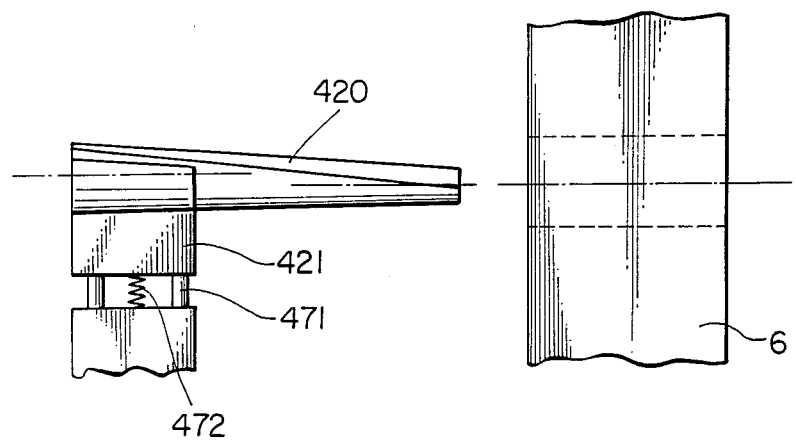
FIGS. 41 and 42 are illustrations of modifications of the fourth embodiment.
Figure 42:
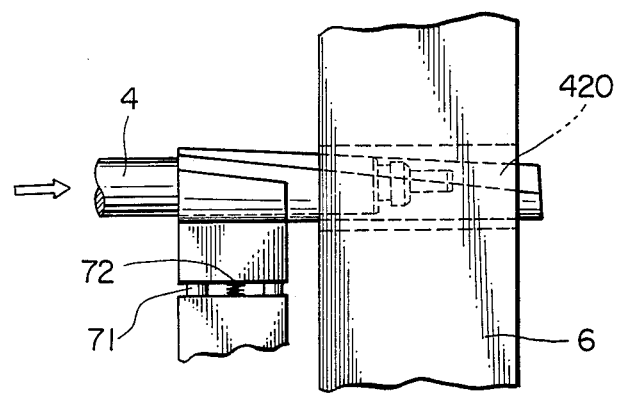

FIGS. 41 and 42 denote a modification of the fuel rod guiding and protecting jig which is the fourth embodiment of the invention. In this modification, the handle 421 is secured to the bracket 438 for movement back and forth through a shaft 471 and is urged upwardly by a spring 472. When the handle 421 is in the raised position, the line 424 on the sleeve 420 along which the handle 421 is secured extends in parallel with one wall of the cell 12, while the center of the smaller end 422 of the sleeve 420 aligns with the center of the cell 12. As the sleeve 420 is projected into the cell 12 followed by the insertion of the fuel rod 4, the handle 421 is urged downwardly against the force of the spring 472 is shown in FIG. 42, thus allowing the fuel rod 4 to smoothly pass the cell 12.

Although the invention has been described through specific terms, it is to be noted here that the described embodiment is not exclusive and various changes and modifications may be imparted thereto without departing from the scope of the invention which is limited solely by the appended claims.

What is claimed is:

1. A method of assembling a nuclear fuel assembly having an upper and a lower tie plate, a plurality of spacer assemblies arranged at suitable intervals between said upper and lower tie plates, each spacer assembly defining a multiplicity of cells such that corresponding cells of said spacer assemblies are aligned in the direction of the axis of said fuel assembly, and a plurality of fuel rods arranged in parallel and received in said cells of said spacer assemblies, wherein said method comprises the steps of inserting a flexible sleeve having a longitudinal slit in the wall thereof into a corresponding cell of each said spacer assembly before the insertion of said fuel rod into each of said cells.

2. A method of assembling a nuclear fuel assembly according to claim 1, wherein said sleeve has a length substantially equal to that of said fuel rod.

3. A method of assembling a nuclear fuel assembly according to claim 1, wherein said sleeve is withdrawn immediately after the insertion of said fuel rod.

4. A method of assembling a nuclear fuel assembly according to claim 1, wherein said sleeve is removed after transportation of said fuel assembly.

5. A fuel rod guiding and protecting jig for use in the assembling of a nuclear fuel assembly having an upper and a lower tie plate, a plurality of spacer assemblies arranged at a suitable interval between said upper and lower tie plates, each spacer assembly defining therein a multiplicity of cells such that corresponding cells of said spacer assemblies are aligned in the direction of the axis of said fuel assembly, and a plurality of fuel rods arranged in parallel and received in said cells of said spacer assemblies, wherein said fuel rod guiding and protecting jig comprises a flexible sleeve having an longitudinal slit formed in the wall thereof, said flexible sleeve having an outer diameter in the freed state which is small enough to permit an easy insertion of said flexible sleeve into the cells of said spacer assemblies, said flexible sleeve being expandable radially outwardly for receiving a fuel rod therein so that the flexible sleeve is wrapped around said inserted fuel rod, said outside diameter of said flexible sleeve when expanded radially outwardly being larger than the outside diameter of said flexible sleeve in the freed state thereof, said flexible sleeve being formed by a sheet material which is wound substantially in a cylindrical form and being provided in the outer peripheral surface thereof with axial grooves for clearing the projected parts in said cells.

6. A fuel rod guiding and positioning jig for use in the assembling of a nuclear fuel assembly having an upper and a lower tie plate, a plurality of spacer assemblies arranged at a suitable interval between said upper and lower tie plates, each spacer assembly defining therein a multiplicity of cells such that corresponding cells of said spacer assemblies are aligned in the direction of the axis of said fuel assembly, and a plurality of fuel rods arranged in parallel and received in said cells of said spacer assemblies, wherein said fuel rod guiding and protecting jig comprises a flexible sleeve having an longitudinal slit formed in the wall thereof, said flexible sleeve having an outer diameter in the freed state which is small enough to permit an easy insertion of said flexible sleeve into the cells of said spacer assemblies, said flexible sleeve being expandable radially outwardly for receiving a fuel rod therein so that the flexible sleeve is wrapped around said inserted fuel rod, said outside diameter of said flexible sleeve when expanded radially outwardly being larger than the outside diameter of said flexible sleeve in the freed state thereof, said outside diameter of said flexible sleeve in the freed state being made smaller along the length in the direction of insertion and the opposing side edges of said flexible sleeve defining said slit overlap each other, said sleeve being attached to a handle along a line extending substantially parallel with the axis of said sleeve, and the distances from the line on said sleeve along which said handle is secured to both edges of said sleeve being different from each other.

7. A fuel rod guiding and protecting jig for use in the assembling of a nuclear fuel assembly having an upper and a lower tie plate, a plurality of spacer assemblies arranged at a suitable interval between said upper and lower tie plates, each spacer assembly defining therein a multiplicity of cells such that corresponding cells of said spacer assemblies are aligned in the direction of the axis of said fuel assembly, and a plurality of fuel rods arranged in parallel and received in said cells of said spacer assemblies, wherein said fuel rod guiding and protecting jig comprises a flexible sleeve having an longitudinal slit formed in the wall thereof, said flexible sleeve having an outer diameter in the free state which is small enough to permit an easy insertion of said flexible sleeve into the cells of said spacer assemblies, said flexible sleeve being expandable radially outwardly for receiving a fuel rod therein so that the flexible sleeve is wrapped around said inserted fuel rod, said outside diameter of said flexible sleeve when expanded radially outwardly being larger than the outside diameter of said flexible sleeve in the freed state thereof, wherein a plurality of said sleeves are arayed in a row and secured commonly to a handle.

8. A fuel rod guiding and protecting jib for use in the assembling of a nuclear fuel assembly having an upper and a lower tie plate, a plurality of spacer assemblies arranged at a suitable interval between said upper and lower tie plates, each spacer assembly defining therein a multiplicity of cells such that corresponding cells of said spacer assemblies are aligned in the direction of the axis of said fuel assembly, and a plurality of fuel rods arranged in parallel and received in said cells of said spacer assemblies, wherein said fuel rod guiding and protecting jig comprises a flexible sleeve having an longitudinal slit formed in the wall thereof, said flexible sleeve having an outer diameter in the freed state which is small enough to permit an easy insertion of said flexible sleeve into the cells of said spacer assemblies, said flexible sleeve being expandable radially outwardly for receiving a fuel rod therein so that the flexible sleeve is wrapped around said inserted fuel rod, said outside diameter of said flexible sleeve when expanded radially outwardly being larger than the outside diameter of said flexible sleeve in the freed state thereof, said sleeve being attached to a handle having an extendable and retractable telescopic construction.

9. A fuel rod guiding and protecting jig according to claim 8, wherein said handle is adapted to be extended and retracted by fluid pressure.

10. A fuel rod protecting liner for protecting a fuel rod in a fuel assembly having an upper and a lower tie plate, a plurality of spacer assemblies arranged at suitable intervals between said upper and lower tie plates, each spacer assembly defining a multiplicity of cells such that corresponding cells of said spacer assemblies are aligned in the direction of the axis of said fuel assembly, and a plurality of fuel rods arranged in parallel and received in said cells of said spacer assemblies, said fuel rod protecting liner comprising means for protecting said fuel rod and including a flexible sleeve adapted to be disposed between the wall of said cell and the surface of said fuel rod, said sleeve having an longitudinal slit formed in the wall thereof, and wherein a plurality of said sleeves are connected into one member such that said sleeves are insertable into corresponding cells.

11. A fuel rod protecting sleeve according to claim 10, wherein the inner surface of said sleeve is made of a self-lubricating material.

12. An apparatus for assembling a nuclear fuel assembly having an upper and a lower tie plates a plurality of spacer assemblies arranged at suitable intervals between said upper and lower tie plates, each spacer assembly defining a multiplicity of cells such that corresponding cells of said spacer assemblies are aligned in the direction of the axis of said fuel assembly, and a plurality of fuel rods arranged in parallel and received in said cells of said spacer assemblies, each of said cell having means for defining therein at least partially a fuel rod receiving spacer having an inside diameter corresponding to the outside diameter of said fuel rod, wherein said apparatus comprises:

i. a fuel rod guiding and protecting jig including a tapered flexible sleeve with a smaller leading end and a larger trailing end and having an longitudinal slit formed in the wall thereof, and a handle secured to said sleeve along a line which opposes substantially diametrically to said slit;

ii. a bracket carrying said handle of said fuel rod guiding and protecting jig;

iii. a feeding means adapted to cause a three-dimensional movement of said bracket such as to cause a movement of the leading end of said sleeve along the surface of said spacer assembly, as well as in the direction perpendicular to said surface of said spacer assembly, thereby to bring said leading end of said sleeve into alignment with a designated cell; and iv. a supporting means disposed between said bracket and said handle and adapted for supporting said handle such as to allow said sleeve to be moved between a first position in which the end of said sleeve aligns with the center of said designated cell in said spacer assembly, and a second position in which said line along which said handle is secured coincide with the inner peripheral surface of said fuel rod receiving space in said cell.

13. An apparatus according to claim 12, wherein said supporting means supports said handle pivotally.

14. An apparatus according to claim 12, wherein said supporting means supports aaid handle for a translational movement.

15. A fuel rod guiding and protecting jig according to claim 14, wherein said fuel assembly has water rods arranged in parallel with said fuel rods, and other sleeves are disposed at positions corresponding to said water rods and are offset from said row of said sleeves.

* * * * *